(12) United States Patent
Mäckel et al.

(10) Patent No.: US 9,365,173 B2
(45) Date of Patent: Jun. 14, 2016

(54) DEVICE FOR STABILIZING A SUPPLY VOLTAGE IN A MOTOR VEHICLE

(75) Inventors: Rainer Mäckel, Konigswinter (DE); Thomas Schulz, Unterensingen (DE); Jürgen Schön, Stuttgart (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 516 days.

(21) Appl. No.: 13/825,652

(22) PCT Filed: Sep. 8, 2011

(86) PCT No.: PCT/EP2011/065508
§ 371 (c)(1),
(2), (4) Date: Apr. 29, 2013

(87) PCT Pub. No.: WO2012/038258
PCT Pub. Date: Mar. 29, 2012

(65) Prior Publication Data
US 2013/0207463 A1  Aug. 15, 2013

(30) Foreign Application Priority Data

Sep. 22, 2010 (DE) .......................... 10 2010 046 232

(51) Int. Cl.
*B60R 16/03* (2006.01)
*H02J 7/00* (2006.01)
*F02N 11/08* (2006.01)

(52) U.S. Cl.
CPC ............ *B60R 16/03* (2013.01); *F02N 11/0862* (2013.01); *H02J 7/00* (2013.01); *F02N 11/0814* (2013.01); *F02N 2200/063* (2013.01); *F02N 2250/02* (2013.01)

(58) Field of Classification Search
CPC ........................................................ B60R 16/03
USPC ....................................................... 307/10.6
See application file for complete search history.

(56) References Cited

U.S. PATENT DOCUMENTS 6,107,697 A * 8/2000 Markelov .................... 307/43
6,597,149 B1 * 7/2003 Urlass et al. ................ 320/104

(Continued)

FOREIGN PATENT DOCUMENTS

DE  10 2008 058646  5/2010  ............ F02N 110/08

OTHER PUBLICATIONS

International Searching Authority, International Search Report—Application No. PCT/EP2011/065508, dated Dec. 4, 2012, together with the Written Opinion of the International Searching Authority, 11 pages.

(Continued)

*Primary Examiner* — Kenneth B Wells
*Assistant Examiner* — James P Evans
(74) *Attorney, Agent, or Firm* — Sunstein Kann Murphy & Timbers LLP

(57) ABSTRACT

A device (1) for stabilizing a supply voltage ($U_{Batt}$) in a motor vehicle, having a function component of the motor vehicle, in particular in the form of a starter (4), a voltage source (10) which is connected to the function component (4) in order to supply the function component (4) with the supply voltage ($U_{Batt}$), characterized in that the voltage source (10) is connected to the function component (4) via a resistor cascade (30) in order to stabilize the supply voltage ($U_{Batt}$).

8 Claims, 2 Drawing Sheets

(56) References Cited

U.S. PATENT DOCUMENTS

| | | | |
|---|---|---|---|
| 2008/0164760 A1* | 7/2008 | Hattori | 307/64 |
| 2008/0185999 A1 | 8/2008 | Matsukawa et al. | 320/166 |
| 2009/0251009 A1 | 10/2009 | Kleinecke et al. | 307/115 |

OTHER PUBLICATIONS

International Searching Authority, Notification Concerning Transmittal of International Preliminary Report on Patentability—Application No. PCT/EP2011/065508, dated Apr. 4, 2013, together with the Written Opinion of the International Searching Authority, 8 pages.

International Searching Authority (English translation), Notification Concerning Transmittal of Translation of the International Preliminary Report on Patentability—Application No. PCT/EP2011/065508, dated Apr. 4, 2013, together with the Written Opinion of the International Searching Authority, 7 pages.

* cited by examiner

DEVICE FOR STABILIZING A SUPPLY VOLTAGE IN A MOTOR VEHICLE

The invention relates to a device for stabilising a supply voltage in a motor vehicle according to the preamble of claim 1.

According to this such a device or such a system has a function component of the motor vehicle, in particular in the form of a starter, and a voltage source, which is connected to the function component in order to supply the function component with the supply voltage.

Said starters or starter motors are used in motor vehicles with internal combustion engines for starting or cranking the motor vehicle, since when they are at a standstill such drives do not provide any torque and therefore do not start up independently. Therefore the starter triggers an inlet and compression stroke of the internal combustion engine. The starter can in particular be an electric motor.

Since in modern motor vehicles the aim is that the internal combustion engine is only operated if the motor vehicle is actually moving along (so-called start-stop function to reduce $CO_2$ emissions), it is important in the onboard electrical system to stabilise the supply voltage to short-time, high-load consumers such as for example a starter, for in addition to the starter there are other permanently operating electrical systems such as navigation, safety and infotainment systems that must be operated without errors. Another example of a short-time, high-load consumer is the ESP.

In order that in the stop-start mode of the motor vehicle, the driver does not have to put up with any restrictions, onboard electrical system support is advisable in particular, for a warm start.

This prevents the driver experiencing a voltage dip due to the starting current.

In this connection a device of the abovementioned kind is known from DE 10 2006 061 064 A1 for motor vehicle onboard electrical system stabilisation, having an electronic relay and a DC/DC converter circuit, wherein when the voltage in the onboard electrical system drops below the nominal voltage the circuit acts as a step-up converter, which stabilises the voltage of a load path of the onboard electrical system by switching the relay with the help of the converter circuit to the nominal voltage, and the circuit, in the case of an input voltage that is greater than or equal to the nominal voltage, does not perform any conversion.

Systems are also known (see FIG. 1), which are supported by a second battery that is connected to the onboard electrical system. In the case of a warm start the starter circuit is supplied via the starter battery. Through suitable circuit elements the remainder of the onboard electrical system is then supplied via a second battery isolated from the starter circuit.

Thus for example from WO 2008/014944 A1 a system is known for supplying voltage to electrical loads in the onboard electrical system of a motor vehicle, in which system the onboard electrical system consists of at least two onboard electrical system regions, the first onboard electrical system region having an electric generator, a vehicle battery, and one or a plurality of first electrical loads, and the second onboard electrical system region has a double-layer capacitor or a so-called supercap, and one or a plurality of second electrical loads. A blocking apparatus, in particular a semiconductor diode or a circuit breaker, is provided between the two onboard electrical system regions. The blocking apparatus permits current to flow from the first onboard electrical system region to the second onboard electrical system region and largely prevents current from flowing in reverse from the second onboard electrical system region to the first onboard electrical system region. The output voltage of the electrical generator is increased and the supercap is charged when a first threshold value of the electrical voltage is not reached in the second onboard electrical system region.

Other approaches include fitting the starter with a switchable series resistor, in order to limit the starting current in the case of a warm start. For this a corresponding switching logic for high currents is also necessary.

On this basis, the problem for the present invention is to provide a device of the abovementioned kind, which has the simplest possible design and thus low production costs.

This problem is solved by the device with the features of claim 1.

According to this, provision is made to connect a resistor cascade between the function component (starter) and the voltage source, wherein the voltage source is in particular a motor vehicle battery, providing a DC voltage.

The resistor cascade for stabilising the supply voltage is preferably designed to be switchable, that is to say that the individual resistors of the resistor cascade can be connected (or disconnected) in succession in order to change the overall resistance of the resistor cascade.

The resistor cascade preferably has at least two cascade branches connected in parallel, wherein each cascade branch has a switch connected in series with a resistor. Here a cascade branch is preferably provided in order to bypass the resistors of the other cascade branches and therefore merely has a switch so that in the case of a cold start a minimum total resistance of the cascade is achieved, if all switches are switched through.

In order to drive the resistor cascade a control unit is provided, which is designed to switch through or open the individual switches, so that in each case a current is able or not able to flow across the resistor concerned of the resistor cascade.

In a variant of the invention the device has a charge pump. Such charge pumps can be supplied with a DC voltage and be designed to generate a higher DC voltage than the input voltage with the same polarity. Unlike DC/DC converters, charge pumps have no inductive components and as a result can be operated with considerably less loss. They are also much less expensive. The current-carrying capacity of charge pumps is limited, however, this can be compensated by the voltage-stabilising resistor cascade, which can serve as an additional voltage limiter.

The charge pump is preferably supplied by the supply voltage of the voltage source (car battery) and in doing so generates an operating voltage for the control unit, which is in particular above the supply voltage which is provided by said voltage source.

Said switches can in particular be designed as semiconductor switches, e.g. in the form of transistors. The gates of the transistors are then driven by the control unit. If a corresponding gate source voltage is present on a transistor, the corresponding drain-source-section before the respective resistor is low-resistance, thus switched through. A current can then flow through the corresponding resistor.

Since the total resistance $1/R_{Tot}=1/R_1+1/R_2+1/R_3+\ldots$ of the resistors $R_1, R_2, R_3, \ldots$ of the resistor cascade connected in parallel can be varied by forced closing or opening of the corresponding transistors (switches), then as a result the supply voltage can also be temporarily influenced, in particular increased, in order to stabilise load peaks by corresponding switching through/opening of the individual switches.

The control unit is preferably designed to connect and/or remove the cascade branches in a time-dependent manner. In this way, for example, individual cascade branches can be connected/removed at certain times after the starter comes into operation in order to influence or stabilise the supply voltage.

The individual cascade branches can of course also be switched as a function of the supply voltage to be stabilised. To this end a voltage sensor is provided, which detects the supply voltage and communicates this to the control unit, which controls (closes and/or opens) the switches (transistors) as a function of the instantaneous supply voltage.

The method described above allows a simple but efficient stabilisation of a supply voltage in an onboard electrical system of a motor vehicle to be achieved, wherein if timing is used further cost savings can be expected, since timing is less complex than regulation of the switches (transistors) as a function of the supply voltage to be stabilised of the device according to the invention.

Further features and advantages of the invention are explained using the following descriptions of the figures.

These show as follows.

Figure 1:
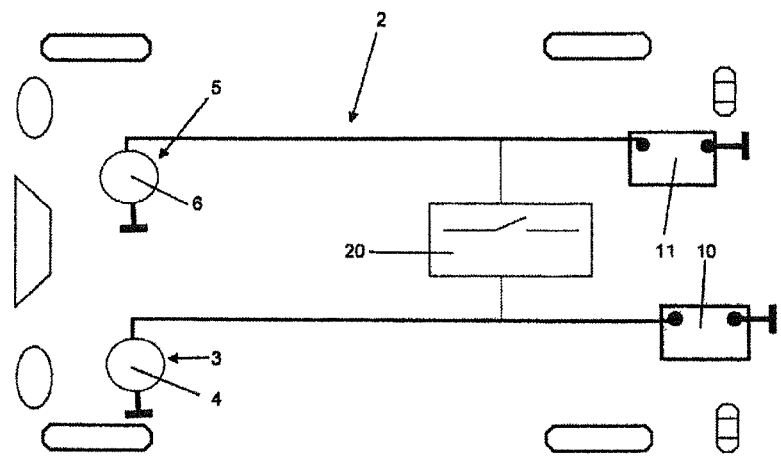
FIG. 1 is a device known from the prior art with two motor vehicle batteries (voltage sources), each of which is assigned to a part of the onboard electrical system and which can be connected together via a switch device.

FIG. 1 is a schematic plan view of a system from the prior art with an additional motor vehicle battery 11 for supporting the onboard electrical system 2. In the case of a warm start, the starter circuit 3 with starter 4 is supplied via the starter battery 10. By means of a suitable switch device 20, the remainder of the onboard electrical system 5 with loads 6, which is then supplied via the second motor vehicle battery 11, is isolated from the starter circuit 3.

Figure 2:
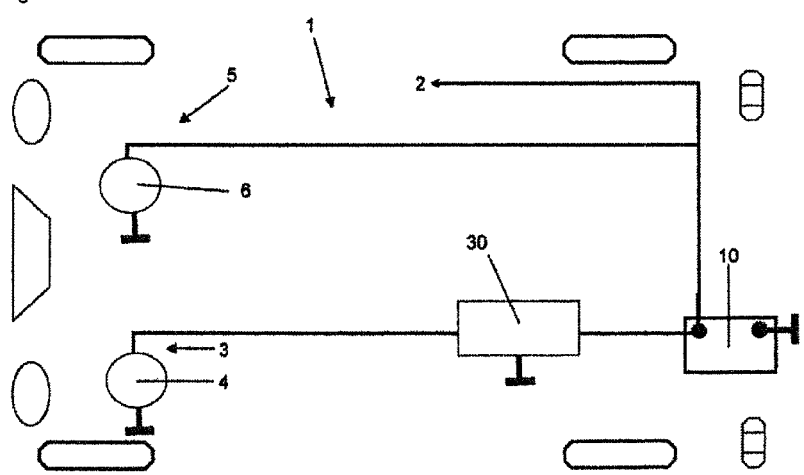
FIG. 2 is a schematic view of a device according to the invention for stabilising a supply voltage for a function component (starter) of a motor vehicle, in which a resistor cascade is connected between the voltage source and the starter.

FIG. 2 is a schematic view of a device 1 according to the invention for stabilisation of a supply voltage $U_{Batt}$ of a voltage source 10 (motor vehicle battery) for a function component of a motor vehicle in the form of a starter 4, in which in order to stabilise the supply voltage $U_{Batt}$ or in order to limit a dip in the supply voltage $U_{Batt}$ when the starter 4 is operated a resistor cascade 30 is connected between the voltage source 10 and the starter 4.

Figure 3:
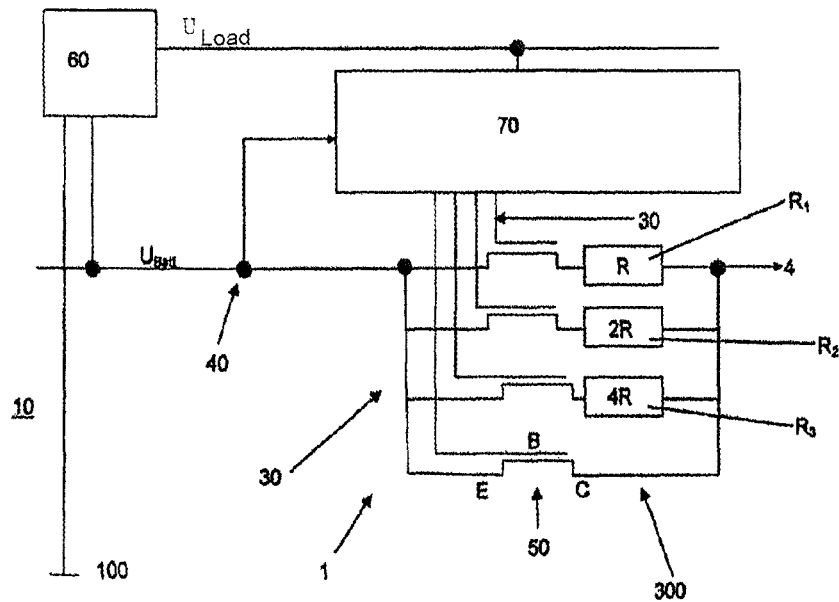
FIG. 3 is a circuit diagram of a device according to the invention according to type in FIG. 2 for stabilising a supply voltage for a function component (starter) of a motor vehicle.

FIG. 3 is a circuit diagram of a device 1 according to the invention according to the type in FIG. 2. According to this, the device 1 has a voltage source 10 in the form of a motor vehicle battery, which provides a supply voltage $U_{Batt}$, a dip in which during the operation of the starter 4 according to FIG. 4 connected with the voltage source 10 can be prevented or counteracted in order that in the onboard electrical system a sufficient supply voltage $U_{Batt}$ can be guaranteed. For this purpose, between the voltage source 10 and the starter 4 a resistor cascade 30 is connected, having resistors $R_1$, $R_2$, $R_3$, . . . connected in parallel, which can have the stated resistance values relative to one another. A branch 300 (for reasons of clarity only one branch is shown, by way of example) of the resistor cascade 30 has no resistor, so that upon switching through of all switches 50 (for reasons of clarity only one switch is shown, by way of example), which are arranged in the other branches 300 respectively in front of the resistors $R_1$, $R_2$, $R_3$, a minimal resistance for a cold start of the starter 4 can be provided for.

For controlling the switches 50 a control unit 70 is used, which is preferably supplied by a charge pump 60 with an operating voltage $U_{Charge}$.

The control unit can switch the individual resistors $R_1$, $R_2$, $R_3$, . . . as a function of the time elapsing since the initial operation of the starter 4 or as a function of the supply voltage $U_{Batt}$ itself. In this case a voltage sensor 40 is provided, which communicates the instantaneous supply voltage $U_{Batt}$ to the control unit 70.

The switches 50 can in particular be transistors. Here the drain-source-section EC represents the actual switch. This is low-resistance (thus conductive) if sufficient voltage is present on the gate-source-section of the respective transistor 50. This can be provided by the control unit 70 via corresponding line connections 30 to the respective gate.

The voltage dip in the supply voltage $U_{Batt}$ during starting can now be caused by an increase in resistance in the starter circuit, thus by corresponding switching of the resistor cascade 30. The total resistance $R_{Tot}$ of the resistor cascade 30 here is $1/R_{Tot}=1/R_1+1/R_2+1/R_3$ and can be varied by corresponding switching of the resistors $R_1$, $R_2$, $R_3$ by means of the switches 50 (at the values given in FIG. 3, e.g. in the range 4R/7–R).

Figure 4:
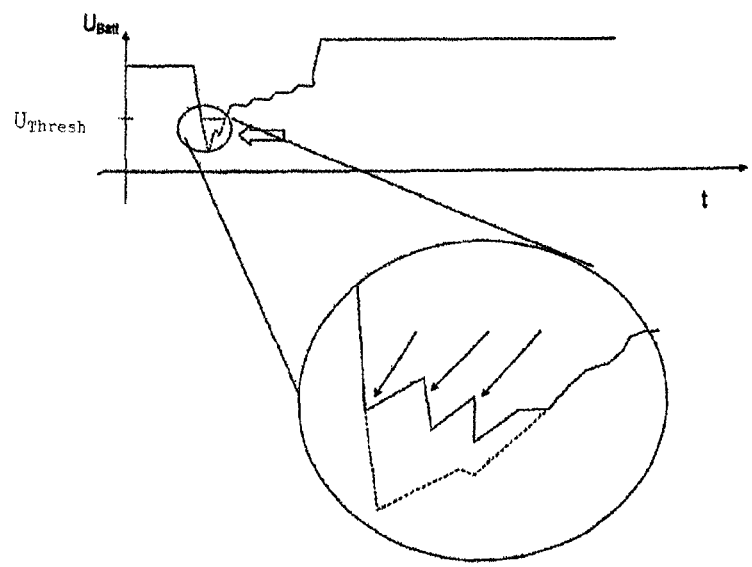
FIG. 4 shows the supply voltage over time in the case of a limited and non-limited voltage dip in the supply voltage.

According to Ohm's law the dip in the supply voltage $U_{Batt}$ can thus be resisted, as shown schematically in FIG. 4. Here, in the voltage-time diagram the broken line shows a voltage dip without limitation when the motor vehicle is started. The continuous line, on the other hand, shows the behaviour over time of the supply voltage $U_{Batt}$ with limitation of the voltage dip upon starting, which is brought about by increasing the resistance in the starter circuit by operation of the switches 50. The enlargement shows the individual switching processes with arrows.

It is conceivable for the limitation of a supply voltage dip to begin as soon as the voltage sensor 40 detects a supply voltage $U_{Batt}$ below a threshold voltage $U_{Thresh}$.

The invention claimed is:

1. Device for stabilizing a supply voltage in a motor vehicle, having:
    a function component of the motor vehicle, in particular in the form of a starter; and
    a voltage source, which is connected to the function component in order to supply the function component with the supply voltage,
    wherein the voltage source is connected to the function component via a resistor cascade in order to stabilize the supply voltage,
    wherein the resistor cascade is switchable and has at least two cascade branches connected in parallel, wherein each cascade branch has a switch connected in series with a resistor.

2. Device of claim 1, further comprising a cascade branch configured to bypass the resistors, the cascade branch having only one switch.

3. Device of claim 1, characterized by a control unit, designed to control the switches.

4. Device of claim 3 wherein the device has a charge pump.

5. Device of claim 4, wherein the charge pump provides an operating voltage for the control unit.

6. Device of claim 1 wherein the switches in each case take the form of a transistor.

7. Device of claim 3, wherein the control unit is designed to switch the cascade branches in each case in a time-dependent manner.

8. Device of claim 3, wherein the control unit is designed to switch the cascade branches in each case as a function of the supply voltage to be stabilized.

\* \* \* \* \*